(12) United States Patent
Rikoski

(10) Patent No.: US 8,379,087 B1
(45) Date of Patent: Feb. 19, 2013

(54) ATTITUDE ESTIMATION USING GROUND IMAGERY

(75) Inventor: Richard Rikoski, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1557 days.

(21) Appl. No.: 11/890,099

(22) Filed: Jul. 16, 2007

Related U.S. Application Data

(60) Provisional application No. 60/928,673, filed on May 1, 2007.

(51) Int. Cl.
*H04N 7/18* (2006.01)

(52) U.S. Cl. .............. 348/144; 348/208.2; 348/208.4; 701/409; 701/448; 701/532; 244/3.21; 244/3.15; 244/164; 244/75.1; 244/175; 244/190; 114/330

(58) Field of Classification Search .............. 348/144, 348/148; 396/7
See application file for complete search history.

(56) References Cited

U.S. PATENT DOCUMENTS

| | | | | |
|---|---|---|---|---|
| 5,072,396 | A * | 12/1991 | Fitzpatrick et al. | 701/409 |
| 5,899,945 | A * | 5/1999 | Baylocq et al. | 701/4 |
| 5,995,903 | A * | 11/1999 | Smith et al. | 701/470 |
| 6,463,366 | B2 * | 10/2002 | Kinashi et al. | 701/13 |
| 6,785,594 | B1 * | 8/2004 | Bateman et al. | 701/9 |
| 7,071,970 | B2 * | 7/2006 | Benton | 348/208.14 |
| 7,352,292 | B2 * | 4/2008 | Alter et al. | 340/945 |
| 7,456,779 | B2 * | 11/2008 | Cross et al. | 342/25 A |
| 7,505,364 | B2 * | 3/2009 | Polvani | 367/131 |
| 7,511,736 | B2 * | 3/2009 | Benton | 348/208.14 |
| 8,019,490 | B2 * | 9/2011 | Ferren et al. | 701/3 |
| 8,045,749 | B2 * | 10/2011 | Rhoads et al. | 382/100 |
| 2003/0081812 | A1 * | 5/2003 | Yamamoto et al. | 382/103 |
| 2007/0269102 | A1 * | 11/2007 | Wang | 382/154 |
| 2008/0211912 | A1 * | 9/2008 | Greenfeld et al. | 348/144 |
| 2009/0125223 | A1 * | 5/2009 | Higgins | 701/200 |
| 2011/0184593 | A1 * | 7/2011 | Swope | 701/12 |

OTHER PUBLICATIONS

B. Jalving, M. Mandt, O. K. Hagen and F. Pøhner, Terrain referenced navigation of AUVs and submarines using multibeam echo sounders, in: Proc. UDT Europe, Nice, CD-ROM (2004).*
Vadlamani, Ananth K., M.S. Mar. 2004, Electrical Engineering and Computer Science, Performance Improvement Methods for Terrain Database Integrity Monitors and Terrain Referenced Navigation (115pp.).*

* cited by examiner

*Primary Examiner* — Greg C Bengzon
(74) *Attorney, Agent, or Firm* — James T. Shepherd

(57) ABSTRACT

Vehicle attitude is estimated relative to a ground surface over which the vehicle is traveling. An actual image of the ground surface over which the vehicle is traveling is compared with stored or predicted model images of the ground surface. The model images have corresponding known vehicle attitudes associated therewith. For one of the model images that most closely matches the actual image, the known vehicle attitude associated therewith is an estimate of an actual vehicle attitude relative to the ground surface over which the vehicle is traveling.

22 Claims, 1 Drawing Sheet ically generated and stored on a database prior to using system
ATTITUDE ESTIMATION USING GROUND IMAGERY Pursuant to 35 U.S.C. §119, the benefit of priority from provisional application 60/928,673, with a filing date of May 1, 2007, is claimed for this non-provisional application.

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to estimation of relative vehicle attitude, and more particularly to a method and system for estimating relative vehicle attitude using an echo-based ground imaging system such as a sonar or radar imager.

BACKGROUND OF THE INVENTION

As an underwater vehicle travels through the water, there are many situations requiring that the relative attitude of the underwater vehicle be known as it relates to the bottom of the body of water. Similarly, as an aircraft flies over a land surface, there are many situations requiring that the relative attitude of the aircraft be known as it relates to the land surface. Currently, underwater vehicles and aircraft are equipped to make measurements of altitude, absolute pitch, and absolute roll. Each measurement is made, respectively, by an altimeter, a pitch sensor, and a roll sensor. In general, altimeters measure altitude by projecting a beam of energy down to the water's bottom or land surface, and then measuring the time it takes to receive the reflection. Conventional pitch and roll sensors measure absolute pitch and absolute roll, respectively, by using a device that compares the orientation of the gravitational field to a referenced vehicle orientation. However, none of these sensors account for slope in the water's bottom or land surface. Thus, the measurements from these conventional sensors cannot be used to estimate the attitude of an underwater vehicle/aircraft relative to an underlying bottom/land surface that is sloped.

SUMMARY OF THE INVENTION

Accordingly, it is an object of the present invention to provide a method and system for estimating relative attitude of an underwater vehicle or an aircraft.

Another object of the present invention is to provide a method and system for estimating relative attitude of an underwater vehicle or aircraft using existing hardware capabilities.

Other objects and advantages of the present invention will become more obvious hereinafter in the specification and drawings.

In accordance with the present invention, a system and method are provided to estimate vehicle attitude relative to a ground surface over which the vehicle is traveling. An actual image of the ground surface over which the vehicle is traveling is generated. Stored or predicted model images of the ground surface are provided along with their corresponding known vehicle attitudes. The actual image is compared to the model images. For one of the model images that most closely matches the actual image, the known vehicle attitude associated therewith is an estimate of an actual vehicle attitude relative to the ground surface over which the vehicle is traveling.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
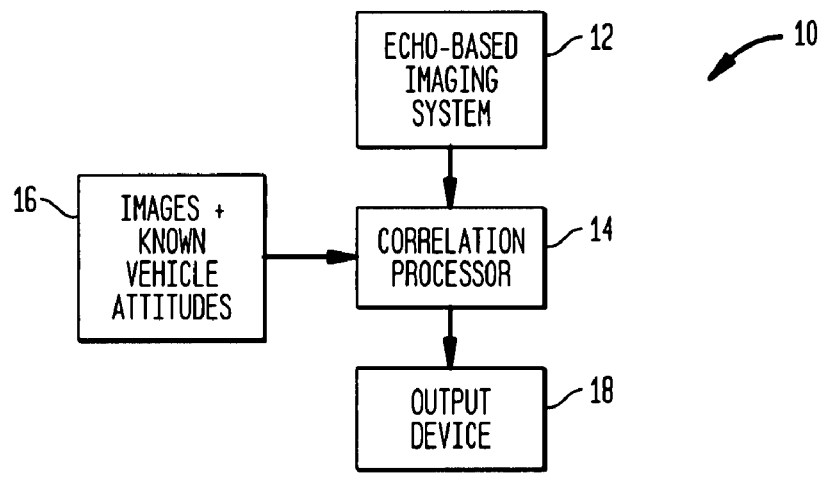
FIG. 1 is a top-level block diagram of an attitude estimation system in accordance with the present invention.

Referring now to the drawings and more particularly to FIG. 1, a system for estimating relative attitude in accordance with the present invention is shown and is referenced generally by numeral 10. Typically, system 10 will be mounted onboard a vehicle traveling above a ground surface. For example, the vehicle could be traveling underwater above the water's bottom, or the vehicle could be an aircraft flying over a land surface. In either case, system 10 provides an estimate of vehicle attitude relative to the ground surface beneath the vehicle where the ground surface can be flat or sloped. Unless otherwise noted, the term "attitude" as used herein refers to the relative attitude of the vehicle.

System 10 uses an echo-based imaging system 12 to generate an actual image of a region above the ground surface over which system 10 is traveling. In general, imaging system 12 is any system that can transmit a beam of energy towards a target region, receive reflections of the energy from the target region using an array of receiving elements, and generate a two-dimensional image from the receiving elements' outputs. For example, if system 10 is to be used on an underwater vehicle, imaging system 12 can be a sonar imaging system (e.g., a forward-looking sonar). If system 10 is to be used on an aircraft, imaging system 12 can be a radar imaging system (e.g., a forward-looking radar). In either case, the image generated by imaging system 12 is passed to a correlation processor 14.

Correlation processor 14 uses the images generated by imaging system 12 to estimate the attitude of the vehicle on which system 10 is mounted. More specifically, processor 14 compares or correlates the actual image generated by imaging system 12 with a plurality of images 16 associated with known vehicle attitudes. That is, images 16 are the same types of images that would be generated by imaging system 12. Each of images 16 is indicative of a particular known vehicle attitude that accounts for a particular bottom or ground slope (e.g., flat or zero slope, or angled up/down/sideways relative to the direction of vehicle travel). Each known vehicle attitude is associated with a particular one of images 16. Images 16 and their corresponding attitude associations can be empirically generated and stored on a database prior to using system 10. However, the present invention is not so limited as images 16 could also be theoretically predicted for a number of known vehicle attitudes with the image predictions and corresponding known vehicle attitudes being stored on a database prior to using system 10. Still further, the image predictions could be predicted in real-time for a number of known vehicle attitudes using prediction models without departing from the scope of the present invention.

Processor 14 implements any of a variety of comparison or correlation schemes to determine which of images 16 is most like the actual image generated by imaging system 12. Once the closest "match" one of images 16 is determined, the known vehicle attitude associated therewith is assumed to be the estimated attitude of the vehicle. This estimated attitude is typically passed to an output device 18. When the end "user" of system 10 is an individual, output device 18 can be a display, a voice synthesizer, or any other device capable of presenting the estimated attitude in a human discernable format. However, it is to be understood that output device 18 is also representative of any device that uses the estimated relative attitude such as a control system, a path planner, and/or a data logger.

Figure 2:
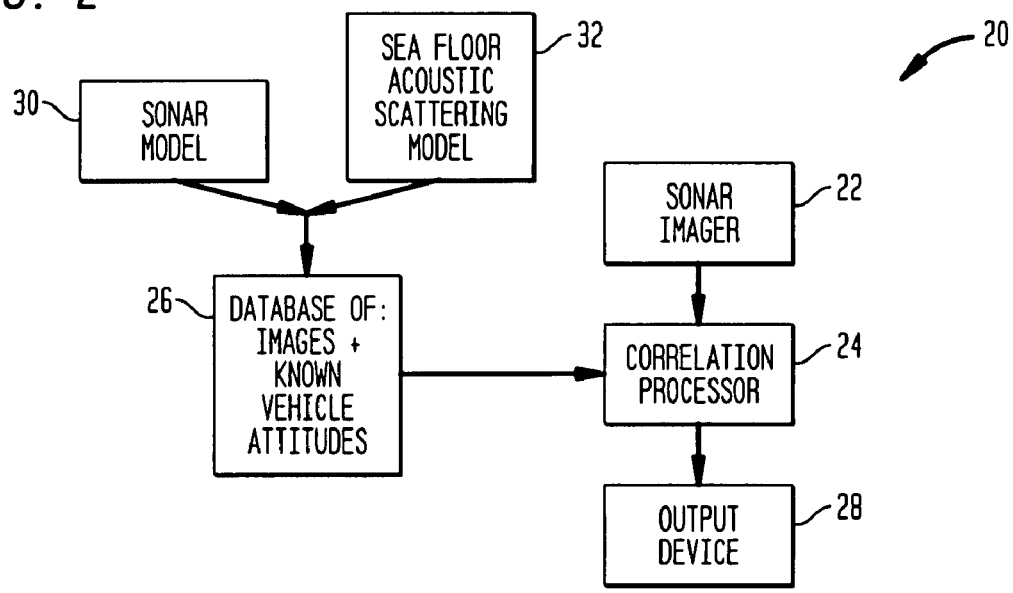
FIG. 2 is a top-level block diagram of an attitude estimation system for an underwater vehicle that uses sonar imagery in accordance with an embodiment of the present invention.

Referring now to FIG. 2, a particular underwater vehicle attitude estimation system in accordance with an embodiment of the present invention is shown and is referenced generally by numeral 20. Attitude estimation system 20 includes a sonar imager 22 that (as is well known in the art) transmits a beam of acoustic energy and receives/uses echoes or reflections of the acoustic energy to generate an image of an underwater region in the path of the acoustic energy beam. For the illustrated example, it will be assumed that sonar imager 22 is a forward-looking sonar system.

The image generated by sonar imager 22 is passed to a correlation processor 24 that implements, for example, a conventional greatest correlation coefficient correlation process. Similar to processor 14, correlation processor 24 is supplied with a plurality of empirically-determined or predicted sonar images, each of which is indicative of a known vehicle attitude that takes the slope of the water's bottom into consideration. For instance, for a forward-looking sonar, if the empirically-determined or predicted sonar image was of a sea floor or bottom sloped down at 45 degrees as viewed by a vehicle (i.e., the vehicle's sonar imager) having an absolute pitch (i.e., relative to the water's surface) of 45 degrees down, the relative pitch would be zero since the sonar's transmit beam would be parallel to the bottom.

In the illustrated embodiment, these empirically-determined or predicted sonar images are stored on a database 26 coupled to correlation processor 24. Each such stored image will have a three-dimensional attitude (i.e., roll, pitch, altitude) relative to a particular bottom slope associated therewith. Accordingly, when correlation processor 24 finds a closest "match" between the actual image (generated by sonar imager 22) and one of the images stored on database 26, the associated attitude is provided to an output device 28.

As mentioned above, the images in database 26 can be generated in an empirical or predictive fashion. In the illustrated example, a sonar model 30 and a sea floor acoustic scattering model 32 are used to generate predictions of the images stored in database 26. As would be understood in the art, sonar model 30 is a model of the transmission and reception properties (i.e., the beam pattern) of the particular sonar imager 22. Briefly, sonar model 30 describes the transmitted energy arriving at various locations relative to sonar imager 22. As would also be understood in the art, sea floor acoustic scattering model 32 describes the intensity of sound scattered back to sonar imager 22 by the bottom of the water. This description can be a function of the incident angle of the sound, bottom roughness, sound frequency, speed of sound at the bottom, density of the bottom, and other bottom properties. One such scattering model is known as a Lambertian scattering model. Models 30 and 32 are combined in accordance with any one of a variety of known methodologies to generate the predicted images for corresponding known vehicle attitudes. This information is stored in database 26.

Attitude estimation system 20 can utilize just sonar imagery to estimate vehicle attitude as long as the sonar's beam is wide enough to resolve/detect changes in altitude, pitch and roll. However, as a sonar beam decreases in beam width, ambiguities can arise between changes in pitch and changes in altitude, or changes in roll and changes in altitude. For example, for a forward-looking sonar having a sonar beam that is too narrow to resolve/detect changes in altitude and pitch, small changes in altitude and pitch can have the same effect on the sonar image. In this situation, the effectiveness of attitude estimation system 20 is compromised. Accordingly, for a narrow beam width sonar, it may be necessary to compensate for such ambiguities.

Figure 3:
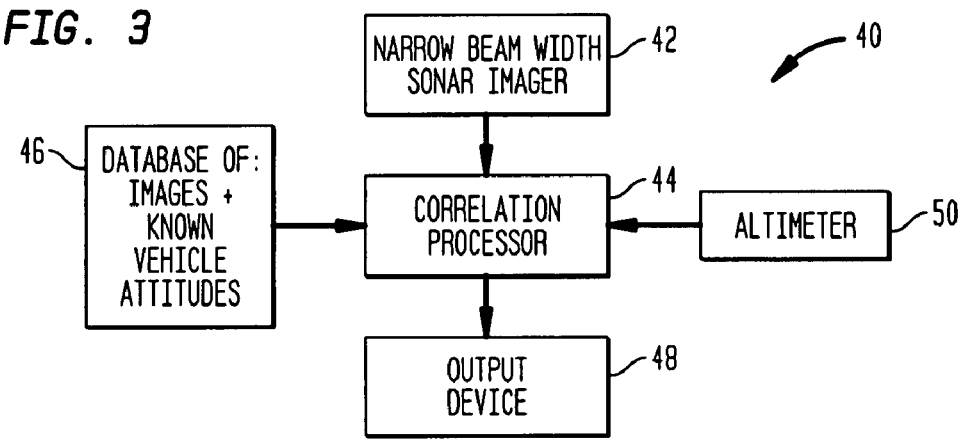
FIG. 3 is a top-level block diagram of an attitude estimation system for an underwater vehicle that uses both sonar imagery and an altitude measurement in accordance with another embodiment of the present invention.

In order to address the above-described narrow beam width-generated ambiguities in a forward-looking sonar, the present invention can be modified as illustrated in FIG. 3. More specifically analogous to elements 22-28 of system 20, attitude estimation system 40 uses a narrow beam width sonar imager 42, a correlation processor 44, a database of images and associated attitudes, and an output device 48. In addition, system 40 utilizes a conventional altimeter 50 (e.g., a wide beam altimeter) that measures relative altitude (of sonar imager 42) and supplies same to correlation processor 44. With the altitude resolved without ambiguity, correlation processor 44 can easily correlate the actual image to the stored images in database 46 in order to determine attitude without the above-described altitude-pitch ambiguity. As in the previous embodiments, attitude associated with the image (from database 46) that most closely matches the actual image is provided to output device 48.

The advantages of the present invention are numerous. Onboard-generated ground imagery alone or in conjunction with an altitude measurement (generated by an inexpensive altimeter) can be used to estimate a vehicle's attitude. The novel core concepts presented herein can be applied in a variety of useful ways. For example, a vehicle (i.e., underwater vehicle or aircraft) could use the attitude estimation system and method to control its orientation relative to a sloped or unsloped ground surface. The present invention could also be used to "land" (e.g., a gentle landing, impalement perpendicular to a ground surface, etc.) the vehicle on a sloped or unsloped ground surface. Still further, the present invention could be used to direct a vehicle along a docking or collision course with a target on or in a sloped or unsloped ground surface. In yet another application, the present invention could be used to maintain an underwater vehicle's constant orientation with respect to the water's bottom to thereby improve the underwater vehicle's sidescan or synthetic aperture sensor survey.

Although the invention has been described relative to a specific embodiment thereof, there are numerous variations and modifications that will be readily apparent to those skilled in the art in light of the above teachings. For example, the ground image could be created/gathered by a Synthetic Aperture Sonar (SAS) or a Sidescan Sonar (SS). A broadside SAS with multiple elements could also be used to form a real aperture image that would then be correlated against a library of images to estimate roll. A squinted SAS with multiple elements could be used to form a squinted real aperture image to estimate rotation around an axis perpendicular to the squint angle. The intensity of the received signal of a 1-dimensional image created/gathered using a single element SAS or SS could be compared to that predicted using sonar and scattering models to estimate vehicle roll (with an altimeter) or roll and altitude. A two sided SAS or SS (i.e., projecting out two sides of a vehicle) could use signals from opposite sides to resolve the pitch/altitude ambiguity associated with a single side. It is therefore to be understood that, within the scope of the appended claims, the invention may be practiced other than as specifically described.

What is claimed as new and desired to be secured by Letters Patent of the United States is:

1. A system for estimating vehicle attitude relative to a ground surface over which the vehicle is traveling, comprising:
   first means for generating an actual image of the ground surface over which the vehicle is traveling;
   second means for providing (i) a plurality of model images of the ground surface, and (ii) a known vehicle attitude associated with each of said model images wherein each said known vehicle attitude accounts for slope in the ground surface represented by a corresponding one of said model images; and
   third means coupled to said first means and said second means for comparing said actual image to said model images wherein, for one of said model images that most closely matches said actual image, said known vehicle attitude associated with said one of said model images is an estimate of an actual vehicle attitude relative to the ground surface over which the vehicle is traveling.

2. A system as in claim 1 further comprising an output device coupled to said third means for presenting said actual vehicle attitude in a human discernable format.

3. A system as in claim 1 wherein said first means comprises a sonar-based imaging system.

4. A system as in claim 1 wherein said first means comprises a radar-based imaging system.

5. A system as in claim 1 wherein said model images are generated using empirical methods, and wherein said second means comprises a database for storing said model images.

6. A system as in claim 1 wherein said model images are generated using prediction methods, and wherein said second means comprises a database for storing said model images.

7. A system as in claim 1 wherein said second means implements a prediction scheme for generating said model images in real-time.

8. A method of estimating vehicle attitude relative to a ground surface over which the vehicle is traveling, comprising the steps of:
   generating an actual image of the ground surface over which the vehicle is traveling;
   providing (i) a plurality of model images of the ground surface, and (ii) a known vehicle attitude associated with each of said model images wherein each said known vehicle attitude accounts for slope in the ground surface represented by a corresponding one of said model images; and
   comparing said actual image to said model images wherein, for one of said model images that most closely matches said actual image, said known vehicle attitude associated with said one of said model images is an estimate of an actual vehicle attitude relative to the ground surface over which the vehicle is traveling.

9. A method according to claim 8 further comprising the step of presenting said actual vehicle attitude in a human discernable format.

10. A method according to claim 8 wherein said step of generating occurs underwater.

11. A method according to claim 8 wherein said step of generating occurs in the air.

12. A method according to claim 8 wherein said step of providing includes the step of empirically generating said model images.

13. A method according to claim 8 wherein said step of generating includes the step of predictively generating said model images.

14. A system for estimating an underwater vehicle's attitude relative to a ground surface over which the underwater vehicle is traveling, comprising:
   a sonar imaging system adapted to be mounted on the underwater vehicle, said sonar imaging system generating an actual image of the ground surface as the underwater vehicle travels thereover;
   means for providing predictions of images of the ground surface for a corresponding plurality of known vehicle attitudes; and
   a processor coupled to said means and said sonar imaging system, said processor comparing said actual image to said predictions wherein, for one of said predictions that most closely matches said actual image, a corresponding one of said known vehicle attitudes associated with said one of said predictions is an estimate of an actual vehicle attitude relative to the ground surface over which the underwater vehicle is traveling.

15. A system as in claim 14 wherein said sonar imaging system comprises a forward-looking sonar imaging system.

16. A system as in claim 14 further comprising an output device coupled to said processor for presenting said actual vehicle attitude in a human discernable format.

17. A system as in claim 14 wherein said means includes a database for storing said predictions and said corresponding plurality of known vehicle attitudes.

18. A system as in claim 14 further comprising an altimeter adapted to be mounted on the underwater vehicle and coupled to said processor, said altimeter measuring altitude of the underwater vehicle relative to the ground surface over which the underwater vehicle is traveling, wherein said altitude is used by said processor in comparing said actual image to said predictions.

19. A system for estimating an underwater vehicle's attitude relative to a ground surface over which the underwater vehicle is traveling, comprising:
   a sonar imaging system adapted to be mounted on the underwater vehicle, said sonar imaging system generating an actual image of the ground surface as the underwater vehicle travels thereover;
   means for providing model images of the ground surface for a corresponding plurality of known vehicle attitudes;
   an altimeter adapted to be mounted on the underwater vehicle, said altimeter measuring altitude of the underwater vehicle relative to the ground surface over which the underwater vehicle is traveling; and
   a processor coupled to said means, said sonar imaging system and said altimeter, said processor comparing said actual image to said model images in light of said altitude so-measured wherein, for one of said model images that most closely matches said actual image, a corresponding one of said known vehicle attitudes associated with said one of said model images is an estimate of an actual vehicle attitude relative to the ground surface over which the underwater vehicle is traveling.

20. A system as in claim 19 wherein said sonar imaging system comprises a forward-looking sonar imaging system.

21. A system as in claim 19 further comprising an output device coupled to said processor for presenting said actual vehicle attitude in a human discernable format.

22. A system as in claim 19 wherein said means includes a database for storing said model images and said corresponding plurality of known vehicle attitudes.

* * * * *